C. H. BERRY.
AUTOMATIC COMPENSATING GAUGE.
APPLICATION FILED APR. 24, 1920.

1,413,514.

Patented Apr. 18, 1922.

C. Harold Berry, INVENTOR.

BY

Shepherd & Campbell

ATTORNEYS

UNITED STATES PATENT OFFICE.

CHARLES HAROLD BERRY, OF DETROIT, MICHIGAN.

AUTOMATIC COMPENSATING GAUGE.

1,413,514.  Specification of Letters Patent.  Patented Apr. 18, 1922.

Application filed April 24, 1920. Serial No. 376,366.

*To all whom it may concern:*

Be it known that I, CHARLES HAROLD BERRY, citizen of the United States, residing at Detroit, in the county of Wayne and State of Michigan, have invented certain new and useful Improvements in Automatic Compensating Gauges, of which the following is a specification, reference being had therein to the accompanying drawings.

The object of the present invention is to provide a gauge constructed in such manner as to accurately indicate the absolute pressure existing in the space to which the gauge is connected.

Practically all of the gauges at present in use are so arranged that their zero points correspond with atmospheric pressure. In other words, these gauges ordinarily indicate, not the true absolute pressure but the difference in pressure between atmospheric pressure and the pressure existing in the space to which the gauge is connected. However, since there is no connection between such space and the atmosphere it follows that such gauges can not take into account fluctuations in atmospheric pressure. Consequently if accurate work is to be done with gauges of the character indicated it is necessary to read the gauge, read the barometer to get the atmospheric pressure, reduce one of these readings to the same unit as the other and add them together to get the absolute pressure desired; (if a pressure is to be measured which is less than atmospheric a vacuum gauge is used and its reading is subtracted from the barometer reading) in order to measure said pressure by gauges of ordinary and known constructions. In short, the readings of a gauge of the ordinary type are significant only when added to (for pressure), or subtracted from (for vacuum), the atmospheric pressure. That is, the ordinary gauge gives only a partial indication of the true absolute pressure, which is what is actually required in accurate work.

Accordingly the present invention contemplates the provision of a gauge having a scale graduated in terms of absolute pressure; i. e. a scale wherein the zero point of the scale corresponds to a true vacuum, and correlating with said scale a barometer acting to automatically correct the gauge or compensate for fluctuations in atmospheric pressure so that the resultant reading of the gauge will be a true indication of the absolute pressure under the then prevailing atmopheric condition. In my copending application serial number 376365, filed on the 24th day of April, 1920, I have illustrated and described a gauge wherein such compensatory action may be achieved by a manual adjustment of the gauge as determined by a reading of the barometer. The present invention contemplates, as above stated, the direct connection of the barometer to the gauge in such manner that the compensatory action may be achieved automatically.

In the accompanying drawing in which like characters of reference designate corresponding parts throughout the several views—

Figure 1:
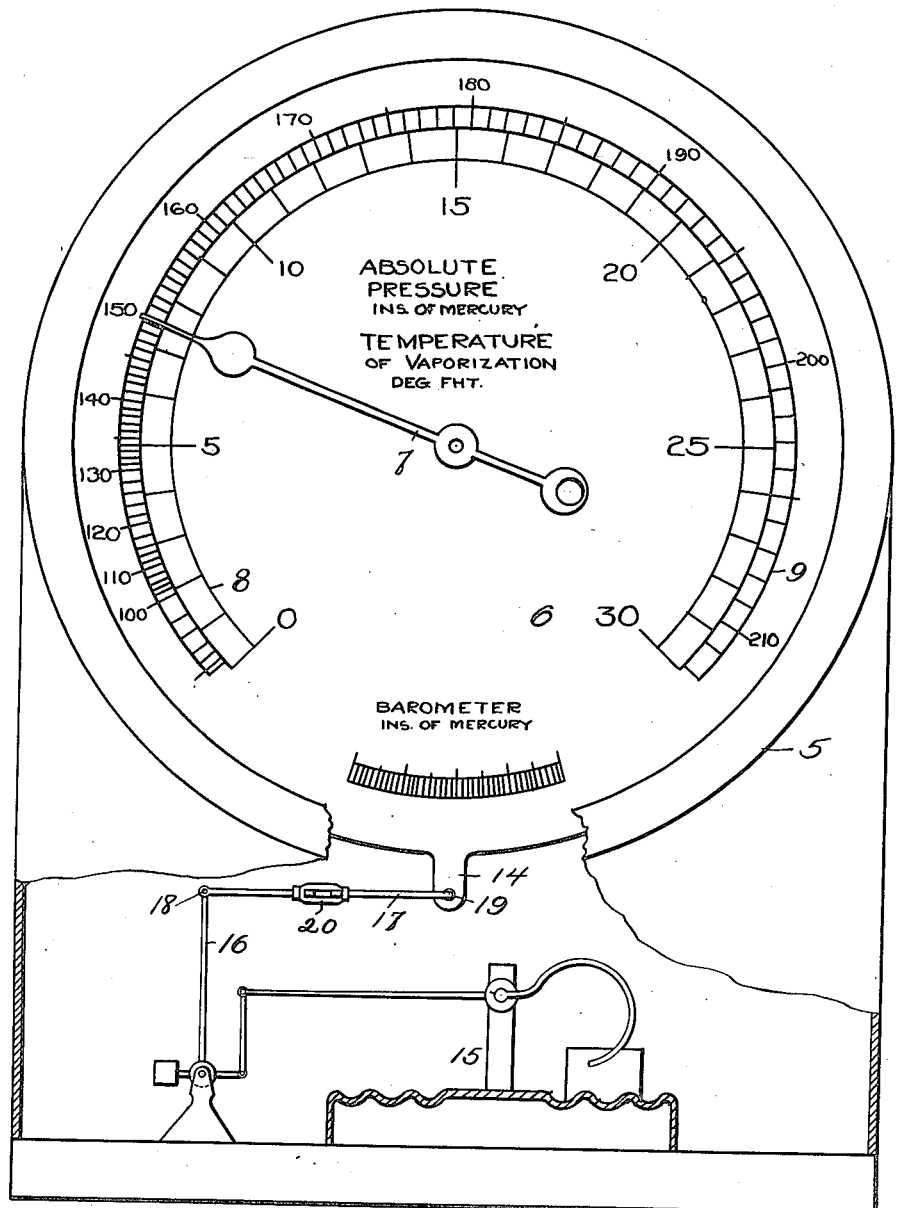
Figure 1 is a front elevation of a gauge constructed in accordance with the invention illustrating one form of dial that may be employed.
Figure 5:
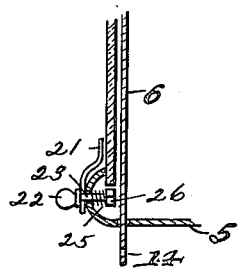

Referring to the drawing and particularly to Fig. 1 5 indicates the case of a gauge having a dial 6. The gauge may be of the well known Bourdon tube type and is provided with a pointer 7 movable over the dial 6. The dial is graduated to form scales 8 and 9 with which the pointer 7 cooperates, the scale 8 indicating absolute pressure in inches of mercury and the scale 9 indicating the temperature of vaporization of water in degrees Fahrenheit.

Figure 2:
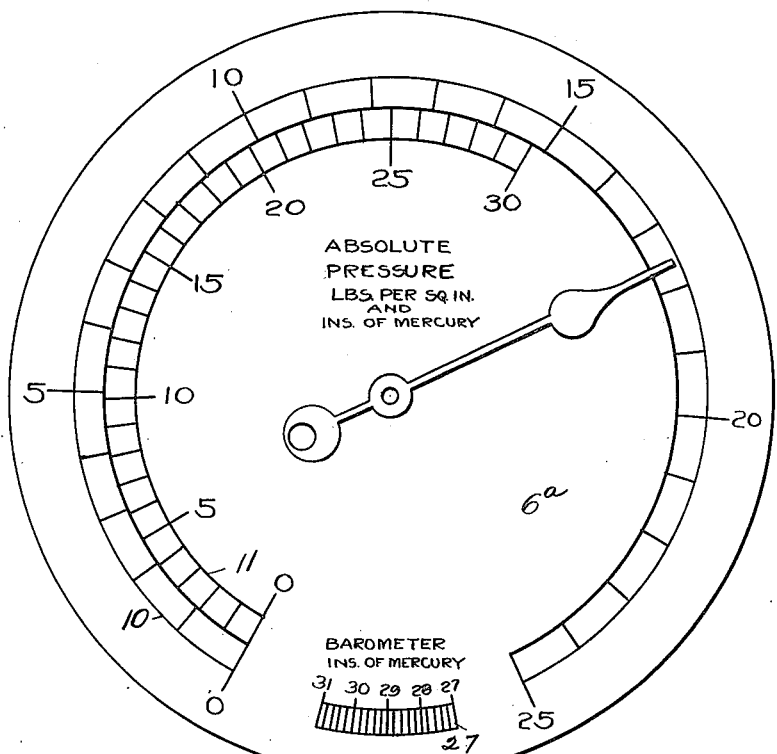
Figs. 2 and 3 are face views of modified forms of dials.

Fig. 2 illustrates a dial, 6ª, provided with a scale 10 graduated in pounds per square inch, absolute pressure, and a scale 11 graduated in inches of mercury. Such scales cover the range of the usual compound gauge and both have the same zero point; viz; absolute vacuum.

Figure 3:
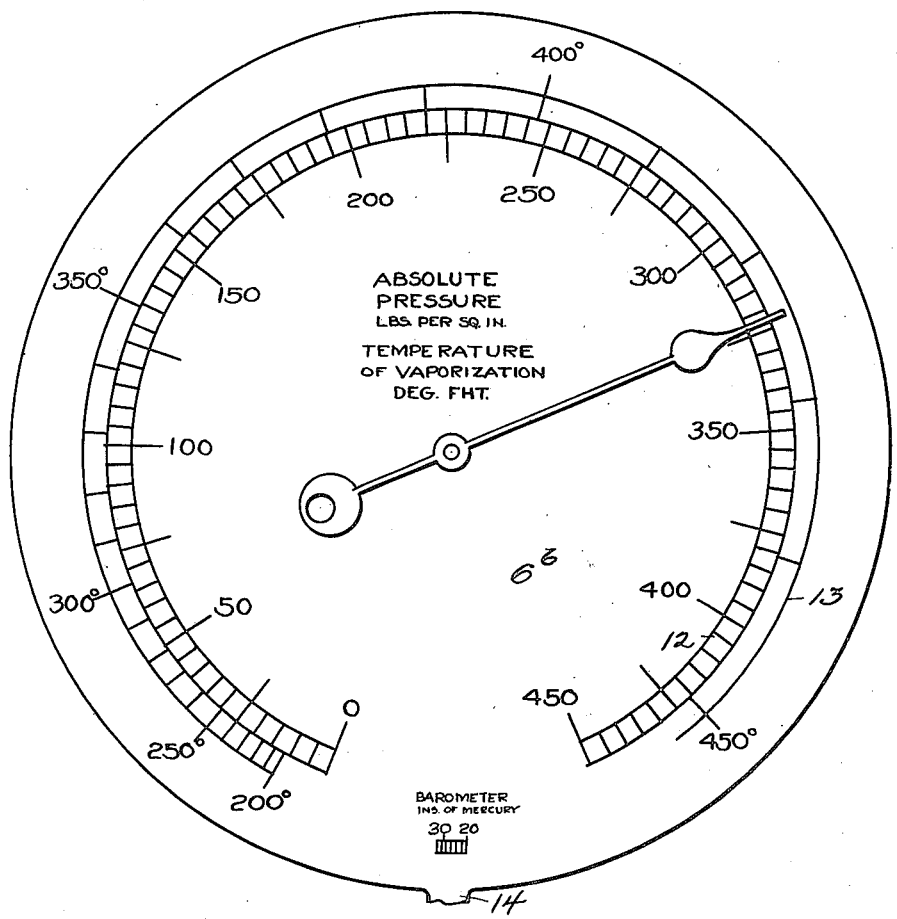

In Fig. 3, a dial 6ᵇ is provided with a scale 12 graduated in pounds per square inch, absolute pressure, and a scale 13 graduated in degrees Fahrenheit, indicative of the temperature of vaporization at the several pressures indicated upon the scale 12. Any of the dials illustrated may be employed in conjunction with the compensating mechanism hereinafter described.

In the graduation of the dials, pressures may be indicated in any units whatever, English, metric, or any other, and in correspondence with the pressure scales there may be scales of temperature of vaporization of any substance, or scales of any other quantity which varies with and depends upon the temperature, such, for example, as scales of the density of saturated vapor, its total heat, or the like. Each of the dials is provided with a depending projection 14. An aneroid barometer 15 is located in juxtaposition to the gauge and preferably within the case 5 and the extremity of the longer pivoted lever 16 of this barometer is connected by a link 17 with the projection 14, said link being pivoted at 18 to the lever 16 and being pivoted at 19 to the projection 14. The link 17 includes a turnbuckle 20 within its length by means of which said link is rendered adjustable as to length. This provides for the ready calibration of the gauge. It is well known that Bourdon tube gauges gradually shift their zero points with age and sustained pressure. The method commonly employed for correcting this is to remove the pointer from the stem and press it on again in a new position so that the gauge registers correctly. With the rotative dial herein shown and the adjustment provided by the turnbuckle 20 small adjustments may be made much more quickly and accurately. Large corrections, when necessary, could be made approximately by removing the pointer in the old way, the final adjustment being secured by means of the turnbuckle.

Figure 4:
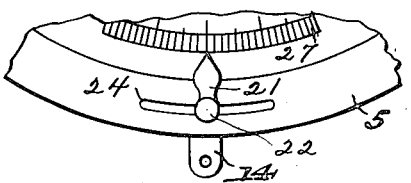
Fig. 4 is a face view of a pointer and barometric scale hereinafter described and Fig. 5 is a sectional view of said pointer.

In Figs. 4 and 5, I have illustrated a construction which may be employed if desired, by means of which the instrument may be caused to serve as a barometer to indicate barometric changes in addition to indicating the absolute pressure. This construction consists of a pointer 21 provided with a knob 22 and a stem 23, said stem being operative in a slot 24 of the casing 5. The pointer is adapted to be held frictionally in adjusted position by means of a spring 25 which bears, between a nut 26 carried by the stem and the adjacent part of the casing 5. A barometric scale 27 formed upon the dial 6 cooperates with the pointer 21 and serves to indicate barometric changes.

It is well known that ordinary aneroid barometers are provided with means for correcting the same and it will be understood that the invention contemplates the use of any well constructed barometer. The barometer having been corrected by comparison with a mercurial barometer and the gauge having been calibrated by means of the turnbuckle and the pointer 21 having been set to accord with the mercurial barometer, said pointer and scale 27 will, thereafter, serve to indicate barometric changes.

While I prefer to employ a gauge of the Bourdon tube type it is manifest that the compensatory action achieved through the provision of the movable dial is in no wise dependent upon the nature of the mechanism employed to move the pointer 7 and it will therefore be understood that any suitable mechanism may be employed for this purpose.

In some cases it is highly desirable to determine quickly and accurately the temperature of vaporization of a substance in process of boiling or evaporating in a boiler, still, evaporator, or other apparatus. In carrying out processes in many of the arts, the operator, often, must now rely upon approximate methods of determination, or consume valuable time in an accurate determination. A gauge constructed in accordance with the present invention will give the desired information at a glance, and thus give the operator immediate information.

It is to be understood that the invention is not limited to the precise construction set forth but that it includes within its purview whatever changes fairly come within either the terms or the spirit of the appended claims.

Having described my invention, what I claim is

1. A gauge comprising a dial graduated in terms of absolute pressure, a pressure operated indicator operative thereover and a barometer correlated with the dial and indicator to automatically cause relative movement of dial and indicator to compensate in the readings for variations in atmospheric pressure.

2. A gauge comprising a case, a rotative dial graduated in terms of absolute pressure, a pressure operated indicator operative thereover, a barometer and a connection between the barometer and the dial through which the dial is rotated to compensate for variations of atmospheric pressure in the resultant direct reading of the absolute pressure indicated by the gauge.

3. A gauge comprising a case, a rotative dial graduated in terms of absolute pressure, a pressure operated indicator operative thereover, and means for turning the dial to compensate in the readings therefrom for variations in atmospheric pressure, said means including a barometer and a rigid link connection between said barometer and said dial.

4. A structure as recited in claim 3 wherein said rigid link is adjustable as to length.

5. A gauge comprising a case, a rotative dial graduated in terms of absolute pressure, a pressure operated indicator operative thereover, and means for turning the dial to compensate in the readings therefrom for variations in atmospheric pressure, said means including an aneroid barometer and a link adjustable as to length pivoted to said dial and to the longer pivoted arm of the barometer.

6. A gauge comprising a case, a rotative dial graduated in terms of absolute pressure, a pressure operated indicator operative thereover, a barometer, a connection between the barometer and the dial whereby the dial is rotated under the influence of the barometer to compensate in the readings therefrom for variations in atmospheric pressure, a barometric scale upon the dial and a movable pointer carried by the case and cooperating with said barometric scale.

7. A gauge comprising a case, a rotative dial graduated in terms of absolute pressure, a pressure operated indicator operative thereover, a connection between the barometer and the dial whereby the dial is rotated under the influence of the barometer to compensate in the readings therefrom for variations in atmospheric pressure, a barometric scale and pointer, one carried by the dial and the other carried by the case.

8. A gauge comprising a case, a dial rotative with respect to the case and having a pair of scales thereon, one graduated in terms of absolute pressure in pounds per square inch and the other graduated in inches of mercury, both of said scales having a common zero point, a pressure operated pointer movable over the dial and cooperating with said scales, a barometer and connections between the barometer and the dial for automatically adjusting the dial with respect to its pointer to compensate for variations in atmospheric pressure in the resultant readings of the absolute pressure as indicated by the pointer upon the scale.

In testimony whereof I hereunto affix my signature.

C. HAROLD BERRY.